(12) United States Patent
Williamson

(10) Patent No.: US 10,967,436 B2
(45) Date of Patent: Apr. 6, 2021

(54) UNIVERSAL ROTATING CHUCK APPARATUS

(71) Applicant: Navarro IP, LLC, Geronimo, TX (US)

(72) Inventor: Kirk Ernest Williamson, Geronimo, TX (US)

(73) Assignee: Navarro IP, LLC, Geronimo, TX (US)

( * ) Notice: Subject to any disclaimer, the term of this patent is extended or adjusted under 35 U.S.C. 154(b) by 0 days.

(21) Appl. No.: 15/901,708

(22) Filed: Feb. 21, 2018

(65) Prior Publication Data

US 2019/0255623 A1    Aug. 22, 2019

(51) Int. Cl.
| | |
|---|---|
| *B23B 31/163* | (2006.01) |
| *B23B 25/06* | (2006.01) |
| *B23B 29/24* | (2006.01) |
| *B23Q 3/155* | (2006.01) |
| *B23Q 15/22* | (2006.01) |

(52) U.S. Cl.
CPC ........ *B23B 31/16037* (2013.01); *B23B 25/06* (2013.01); *B23B 31/16041* (2013.01); *B23B 29/242* (2013.01); *B23B 2260/044* (2013.01); *B23B 2260/07* (2013.01); *B23Q 3/15513* (2013.01); *B23Q 15/22* (2013.01); *Y10T 279/1926* (2015.01)

(58) Field of Classification Search
CPC ........ B23B 31/16004; B23B 31/16008; B23B 31/16037; B23B 31/16079; B23B 31/16041; B23B 31/24; B23B 2231/42; B23B 2260/044; B23B 29/242; B23B 25/06; B23B 2260/07; B23Q 5/348; B23Q 15/22-24; B23Q 3/15513; Y10T 279/1926; Y10T 279/27; Y10T 483/1719; Y10T 483/138; Y10T 82/2506
See application file for complete search history.

(56) References Cited

U.S. PATENT DOCUMENTS

| | | | |
|---|---|---|---|
| 1,455,283 A * | 5/1923 | Bullard, Jr. ............ | B23B 31/28 279/110 |
| 1,807,385 A * | 5/1931 | Church .................. | B23B 31/28 279/114 |

(Continued)

FOREIGN PATENT DOCUMENTS

| | | | |
|---|---|---|---|
| DE | 102010018342 A1 * | 1/2012 | ....... B23B 31/16004 |
| SU | 1199475 A1 * | 12/1985 | |

*Primary Examiner* — Eric A. Gates
*Assistant Examiner* — Chwen-Wei Su
(74) *Attorney, Agent, or Firm* — Matthews, Lawson, McCutcheon & Joseph, PLLC

(57) ABSTRACT

A universal rotating chuck system capable of accommodating multiple small-batch or one-off machining jobs, involving workpieces of different diameter and composition, comprises a rotating chuck having multiple jaws that may be adjusted positionally inward or outward towards the longitudinal centerline of the workpiece or removed entirely. The chuck is rotated by a dual-motor system driving an inner and outer shaft, where the inner shaft is selectively coupled to the outer shafts to rotate independently and adjust the jaws, or rotate alongside the outer shaft to rotate the chuck. In operation, the system is capable of conducting numerous machining operations independent of direct user intervention, including loading/unloading workpieces, loading/unloading tools, measuring tools and workpieces for quality control, and storage.

9 Claims, 8 Drawing Sheets

(56) References Cited

U.S. PATENT DOCUMENTS

| | | | | |
|---|---|---|---|---|
| 1,971,537 | A * | 8/1934 | Sloan | B23B 31/28 |
| | | | | 279/119 |
| 2,528,442 | A * | 10/1950 | Leifer | B23B 31/28 |
| | | | | 279/114 |
| 3,499,657 | A * | 3/1970 | Giraud | B23B 31/16004 |
| | | | | 279/114 |
| 4,821,402 | A * | 4/1989 | Kosho | B23Q 3/101 |
| | | | | 483/20 |
| 6,079,303 | A * | 6/2000 | Lyachovitsky | B23B 31/28 |
| | | | | 279/114 |
| 8,650,729 | B2 * | 2/2014 | Momoi | B23B 3/161 |
| | | | | 29/27 C |
| 9,555,479 | B2 * | 1/2017 | Tiefenbock | B23B 31/16037 |
| 9,561,545 | B2 * | 2/2017 | Hiestand | B23B 31/16225 |
| 2014/0318331 | A1 * | 10/2014 | Walz | B23B 3/16 |
| | | | | 82/120 |
| 2015/0113790 | A1 * | 4/2015 | Hiestand | B23B 31/28 |
| | | | | 29/559 |
| 2015/0352641 | A1 * | 12/2015 | Mies | G01B 5/0004 |
| | | | | 279/114 |

\* cited by examiner

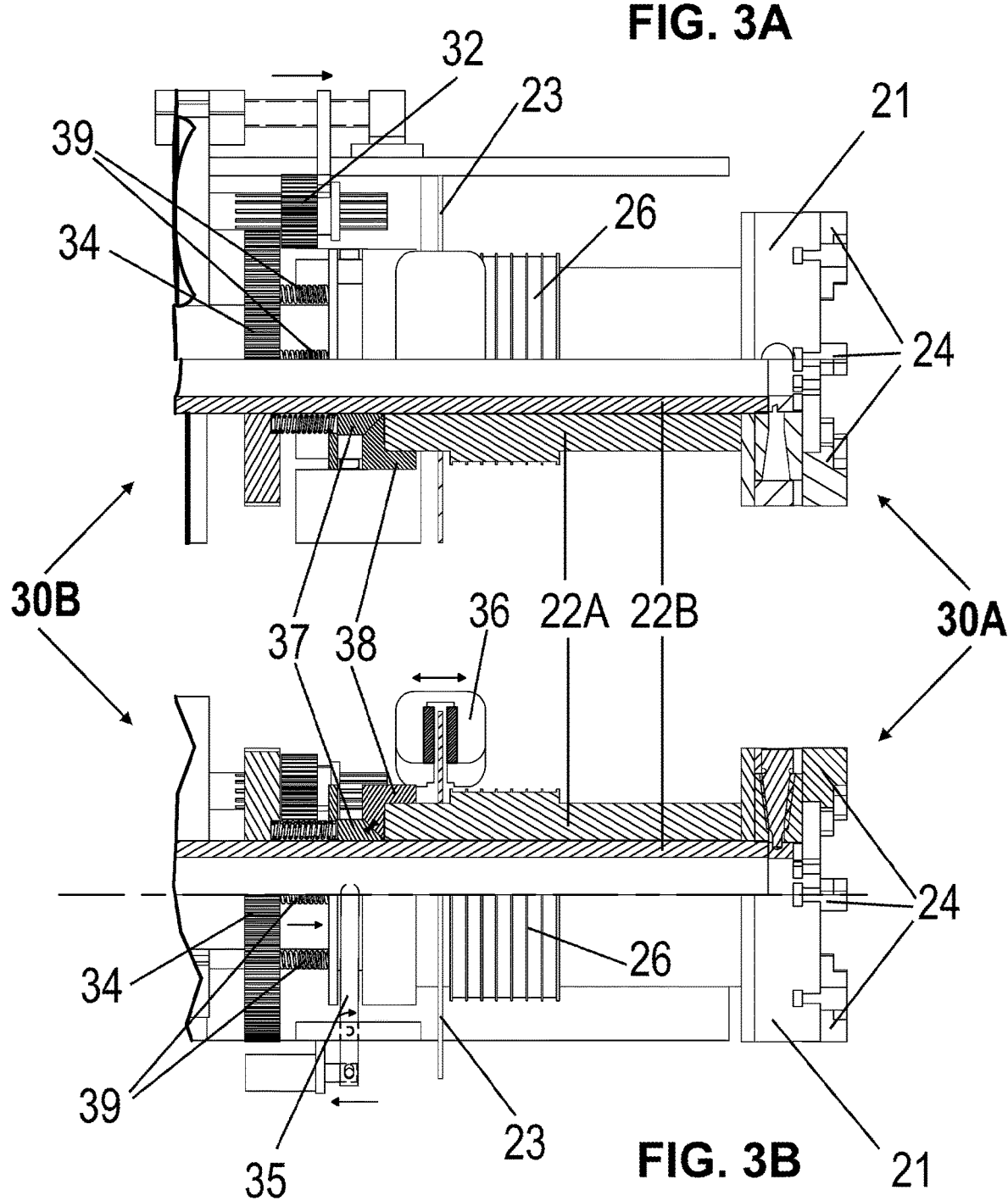

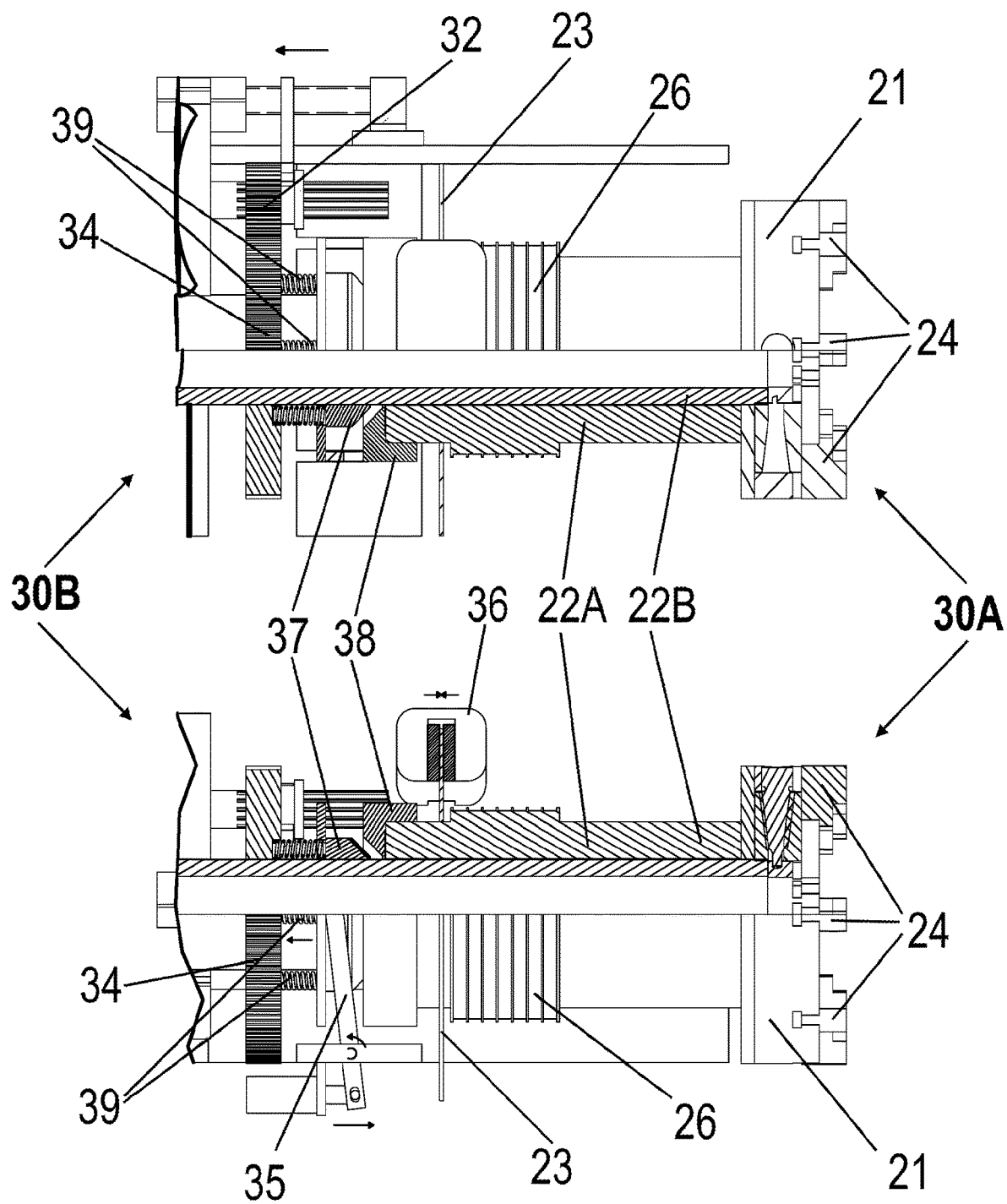

UNIVERSAL ROTATING CHUCK APPARATUS

FIELD

Embodiments usable within the scope of the present disclosure relate, generally, to apparatuses and systems usable for machining workpieces affixed to a rotational chuck having a large degree of customizability and autonomous operation capability.

BACKGROUND

The recent trend from manual machining to computer-controlled machining (most commonly referred to as "computer numerical control" or CNC machining) has increased the expense of small-batch or one-off machining projects compared to projects ordered in large quantities. This is due to the need to design a program for the individual order, and run the program on proprietary machines that are designed to efficiently process work pieces for large-quantity orders, and which may or may not be ideally suited to the needs of a smaller project.

As a result, there is a demand for smaller batch quantities and methods making more versatile use of the huge capital investment in equipment. The ability to perform smaller batch runs can make an entire company more reactive to market demands.

For instance, a customer may wish to order a one-off production of a single work piece in an exotic alloy, while most machine shops are geared towards the use of more common alloys.

While manual machining is still possible, the lack of qualified manual machinists will result in the labor costs being significantly more expensive, as well as the fact that manual machining is inherently subject to a greater degree of error than CNC machining.

A need exists for a more general computer-controlled machining apparatus that is capable of automatically processing small-batch or one-off work piece orders which may differ significantly in material content or dimensional specifications, and which may require different tools in order to shape.

Embodiments usable within the scope of the present disclosure meet these needs.

BRIEF DESCRIPTION OF THE DRAWINGS

In the detailed description of the embodiments of the invention presented below, reference is made to the accompanying drawings, in which:

FIGS. 3A-3B depict two side views of the rotating chuck, braking mechanism, and jaw adjustment mechanism configured for rotation of the workpiece.

FIGS. 4A-4B depict two side views of the rotating chuck, braking mechanism, and jaw adjustment mechanism configured for adjustment of the jaws.

The depicted embodiments of the invention are described below with reference to the listed figures.

DETAILED DESCRIPTION OF THE EMBODIMENTS

Before explaining the present invention in detail, it is to be understood that the present invention is not limited to the particular embodiments described and depicted and that the present invention can be practiced or carried out in various ways.

Before describing selected embodiments of the present disclosure in detail, it is to be understood that the present invention is not limited to the particular embodiments described herein. The disclosure herein is illustrative of one or more presently preferred embodiments and variations thereof, and it will be appreciated by those skilled in the art that various changes may be made without departing from the spirit of the invention.

As well, it should be understood the drawings are intended to illustrate and plainly disclose presently preferred embodiments to one of skill in the art, but are not intended to be manufacturing level drawings or renditions of final products and the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings to be illustrative and non-limiting, and that the components may be oriented differently, for instance, during transportation and manufacturing as well as operation.

The embodiments described below provide an apparatus and system for automatically manufacturing one-off or small-batch workpieces having disparate specifications with a single machine.

Figure 1:
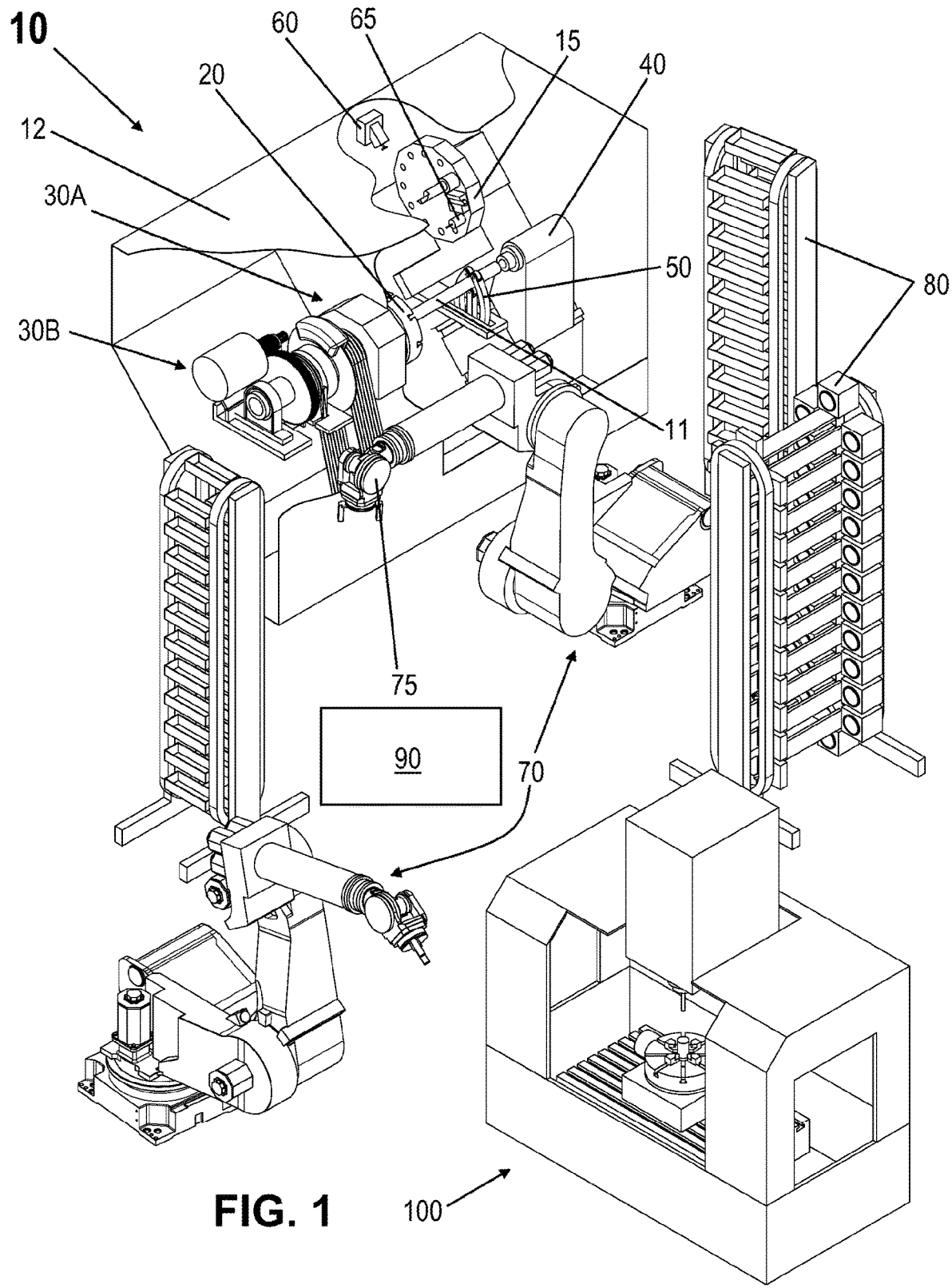
FIG. 1 depicts a perspective, cutaway view of the apparatus.

Turning first to FIG. 1, a high-level illustration of an embodiment of the system 10 is shown with workpiece 11, tool housing 15, rotating chuck 20, chuck drive mechanism 30A, chuck jaw adjustment mechanism 30B, rear support mechanism 40, centerline support mechanism 50, set point sensor 60, and workpiece sensor 65 all programmably adjustable within work envelope 12, either via direct adjustment of the motor mechanisms (set forth subsequently) or by robot 70, including a manipulator 75 and the use of storage systems 80. Computer 90 allows for automation of the system components. Each of these components will be described in greater detail as set forth below.

Broadly speaking, the chuck drive mechanism 30A can rotate the chuck 20, which can hold workpiece 11 in adjustable jaws (set forth subsequently). Jaw adjustment mechanism 30B can include a braking mechanism (set forth subsequently) to prevent unwanted movement of the chuck jaws while the chuck is rotating. Workpiece 11 can be supported at the opposite end of the chuck 20 by rear support mechanism 40, as well as centerline support mechanism 50; both of these mechanisms can be automatically positioned relative to workpiece 11 based on the specifications of the desired workpiece 11 shape.

Tool housing 15 is shown with multiple tools and sockets, in addition to workpiece sensor 65. In an embodiment, tool housing 15 can include multiple sockets for receiving different tool piece ends to be swapped out by robot 70 and manipulator 75. Robot 70 and manipulator 75 can also swap workpiece 11 in and out of the machine for other workpieces (not shown). Set point sensor 60 detects the wear and tear of tool heads (set forth subsequently) mounted to tool housing 15. Workpieces and tool heads can be stored by robot 70 in storage systems 80. Vertical mill 100 is simply a vertical embodiment of the system which works on identical principles to the horizontal embodiment described herein.

Robot 70 may be any manipulating tool known in the art, e.g., a Fanuc™ R-2000iB/165F. Storage systems 80 may be any conveyance system known in the art, e.g., a Vidir™ Shelving Carousel or Vertical Lift System. Set point sensor 60, and workpiece sensor 65 may comprise any probe known in the art, e.g., a Renishaw™ OLP, RMP, RLP, LP2, OTS, RTS, TS34, NC4 or TRS2.

Computer 90 may be any type of computer with a processor and memory capable of being programmed to control the components of the system 10. Computer 90 is represented by a simple box so as to illustrate it may be a terminal, laptop, or embedded system, and may be located inside or outside the work envelope without departing from the scope of this disclosure. Furthermore, computer 90 may have a wired or a wireless (e.g., wi-fi, Bluetooth, radio) connection to the components of system 10 (wired embodiment not depicted for clarity). Computer 90 is capable of receiving location and/or pressure input from, and controlling, chuck 20, rear support mechanism 40, centerline support mechanism 50, set point sensor 60, and workpiece sensor 65, either via direct motor control or through manipulation by robot 70 and manipulator 75 (e.g., to store tools in storage systems 80). In an embodiment, the computer can be controlled by a non-proprietary program.

Figure 2A:
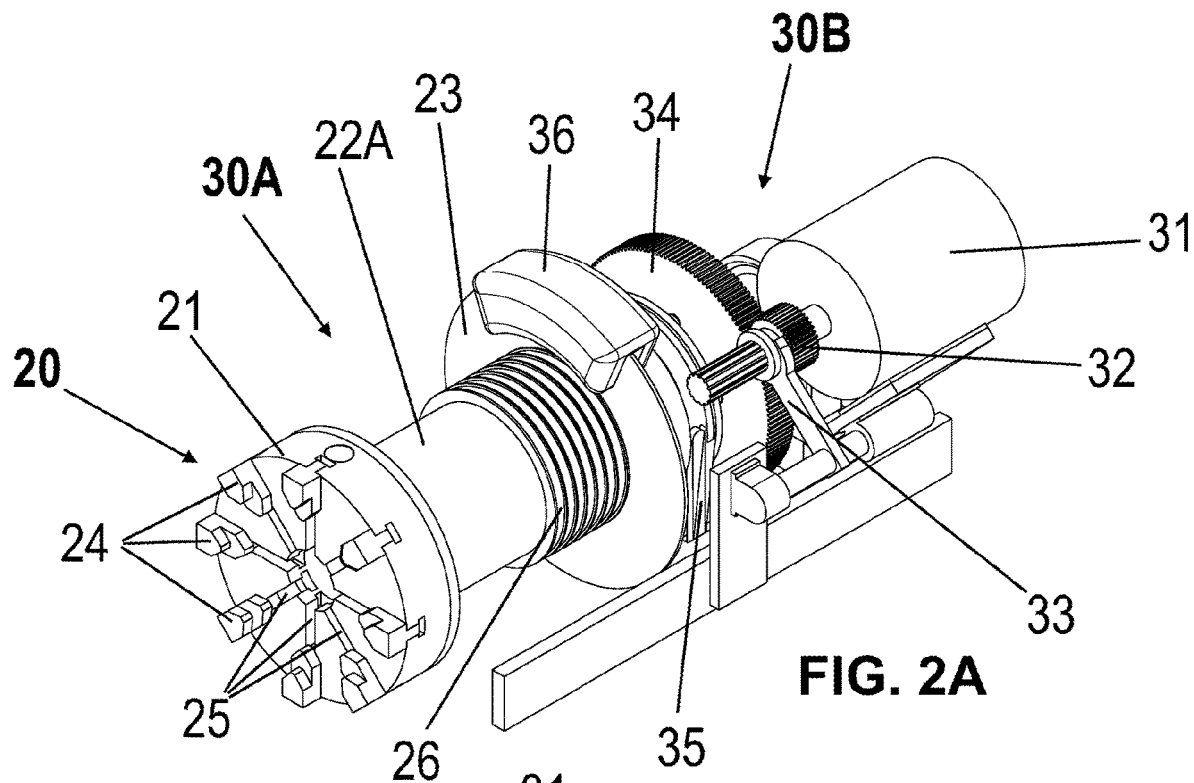
FIGS. 2A-2B depict two perspective views of a rotating chuck, braking mechanism, and jaw adjustment mechanism.
Figure 2B:
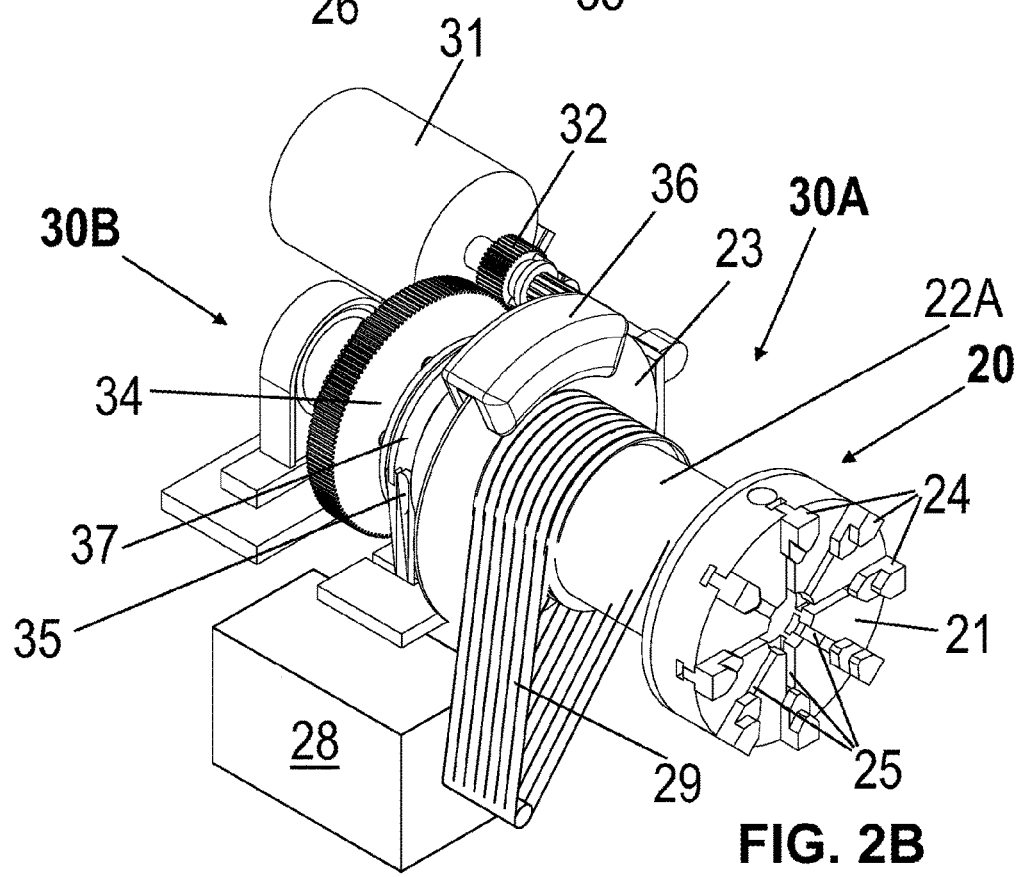
Figure 5A:
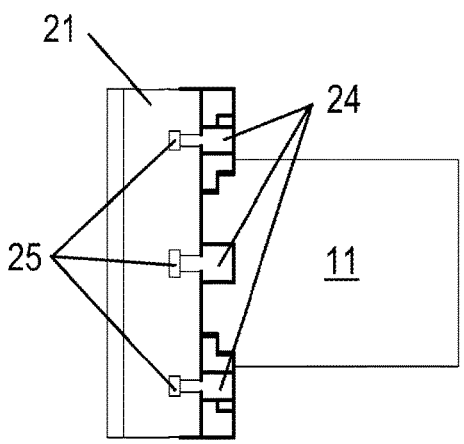
FIGS. 5A-5D depict front and side views of various configurations of the rotating chuck jaws.
Figure 5B:
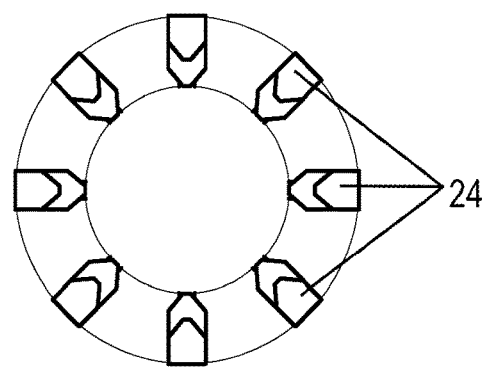
Figure 5C:
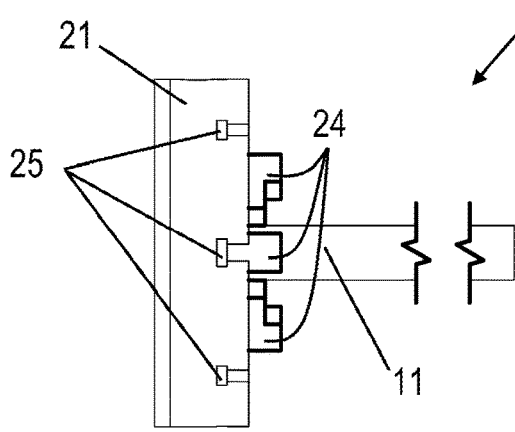
Figure 5D:
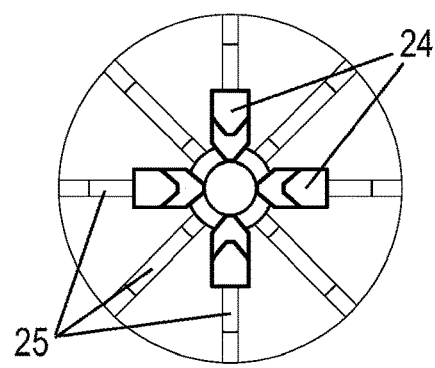

Turning now to FIGS. 2A-2B, two perspective views of an embodiment are shown with additional detail for chuck 20, chuck drive mechanism 30A, and chuck jaw adjustment mechanism 30B. As shown, chuck drive mechanism 30A comprises an external motor 28 (omitted in FIG. 2A for clarity) which turns outer shaft 22A via a belt 29 (also omitted in FIG. 2A) connected to belt attachment 26, and outer shaft 22A in turn rotates chuck head 21. As further shown, chuck jaw adjustment mechanism 30B comprises a motor 31 that rotates driver gear 32, which interacts with shaft gear 34. Shaft gear 34 rotates inner shaft 22B (set forth subsequently in FIGS. 3A and 3B) to adjust the positions of jaws 24 within slots 25 utilizing a spiral scroll chuck mechanism known in the art.

It is an intent of this invention to provide a manufacturing system which can be retrofitted onto an existing chuck, mill, or lathe mechanism. Thus, the external motor may be any suitable motor capable of rotating the outer shaft 22A. (Belt attachment 26 may be omitted in favor of, e.g., a secondary gear system without departing from the scope of the invention.) Examples of existing mills and lathes which may be suitable for use with the invention include the Mori Seiki™ SL series, Doosan Puma™ 3100 and 400 series, or the HAAS™ ST and VF series.

The relationship between outer shaft 22A and the inner shaft 22B can be controlled by two mechanisms: a disc brake 36 which selectively engages with disc 23 in order to prevent movement of the outer shaft 22A while the inner shaft 22B rotates via the motor 31, and a clutch fork 35 which selectively engages with male clutch cone 37 in order to disengage it from female clutch cone (not shown), which in turn pushes driver gear 32 (connected to male clutch cone 37 via clutch arm 33) out of alignment from shaft gear 34 and, thereby, disconnects motor 31 from the rest of the chuck jaw adjustment mechanism 30A, allowing the external motor (not shown) to drive both outer shaft 22A and inner shaft 22B.

FIGS. 2A-2B depict an embodiment having a chuck head 21 having eight jaws 24 in eight slots 25, although only three of each are highlighted in the interests of clarity. While prior art chucks have featured adjustable jaws which allowed adjustments along pre-set diameters, the jaws 24 are infinitely programmable along the slots 25 and can be adjusted to within 1.5 mm (01. inches) of the size programmed to accommodate varying diameters of workpiece and exert a programmable clamping pressure thereupon. In addition, the jaws 24 may be removed from the chuck head 21 (set forth subsequently) to accommodate smaller workpieces which may not have sufficient diameter to receive force from all eight jaws.

Turning now to FIGS. 3A-4B, the chuck drive and jaw adjustment mechanisms 30A, 30B are shown in greater detail in a side view with partial cross-sections. FIGS. 3A-3B depict the outer shaft 22A and inner shaft 22B engaged, such that the rotation of the shafts are in sync and being driven by the external motor (not shown) to rotate chuck head 21. FIGS. 4A-4B depict the outer shaft 22A and inner shaft 22B disengaged, such that outer shaft 22A does not rotate and motor 31 drives inner shaft 22B to adjust the position of the jaws 24.

Referring to FIGS. 3A-3B specifically (showing the engaged shafts moving in sync), elastic members 39 are shown in the side view biasing the male clutch cone 37 away from shaft gear 34 without resistance from clutch fork 35. Male clutch cone 37 can be connected via clutch arm 33 (depicted in FIG. 2A) to the driver gear 32. Thus, by pushing the male clutch cone 37 away from the shaft gear 34, the driver gear 32 moves forward and out of mesh with the shaft gear 34, thus failing to translate energy from motor 31 (depicted in FIGS. 2A-2B). Male clutch cone 37 pushes forward into the braking surface of female clutch cone 38, which is of sufficient friction to translate movement between the inner shaft 22B (attached to male clutch cone 37) and the outer shaft 22A (attached to female clutch cone 38). The attachment between the male and female clutch cones 37, 38, as well as the disengagement of disc brake 36 from disc 23, allows rotational movement of the outer shaft 22A to be translated to the inner shaft 22B such that both move in sync to rotate the chuck head 21 and in turn workpiece 11 (depicted in FIG. 1).

Referring to FIGS. 4A-4B specifically (showing the shafts disengaged), clutch fork 35 is shown pressing against the male clutch cone 35. This pressing disconnects male clutch cone 37 from female clutch cone 38, and compresses the elastic members 39, thereby moving shaft gear 34 and driver gear 32 into alignment, and translating rotational energy from motor 31 to inner shaft 22B alone. Meanwhile, disc brake 36 engages with disc 23, thereby blocking any rotation from being imparted by external motor through belt attachments 26 and stopping rotation of the outer shaft 22A (and thus chuck head 21). Instead the rotational motion of inner shaft 22B translates into a scroll chuck system (not shown) located behind chuck jaws 24 and permits the chuck jaws 24 to adjust position within the chuck head 21.

Turning now to FIGS. 5A-5D, the chuck 20 is shown in greater detail illustrating how the system can accommodate varying workpieces. If workpiece 11 has a larger diameter, the chuck head 21 can be configured with eight jaws 24, all at the outer edge of their respective slots 25, as illustrated in FIGS. 4A-4B. If workpiece 11 has a smaller diameter, the chuck head 21 can be configured with only four jaws 24, at the respective inner edges of slots 25. As with the earlier figures, only some of the jaws and slots are highlighted for clarity. Embodiments of the invention may feature any number of slots and jaws, including as few as 2 jaws or as many as are needed to accommodate and adequately steady the diameter of the workpiece 11. The jaws are variably programmable to within 1.5 mm (0.1 inch) in order to control the pressure of the grip relative to the diameter of the workpiece 11.

Figure 6:
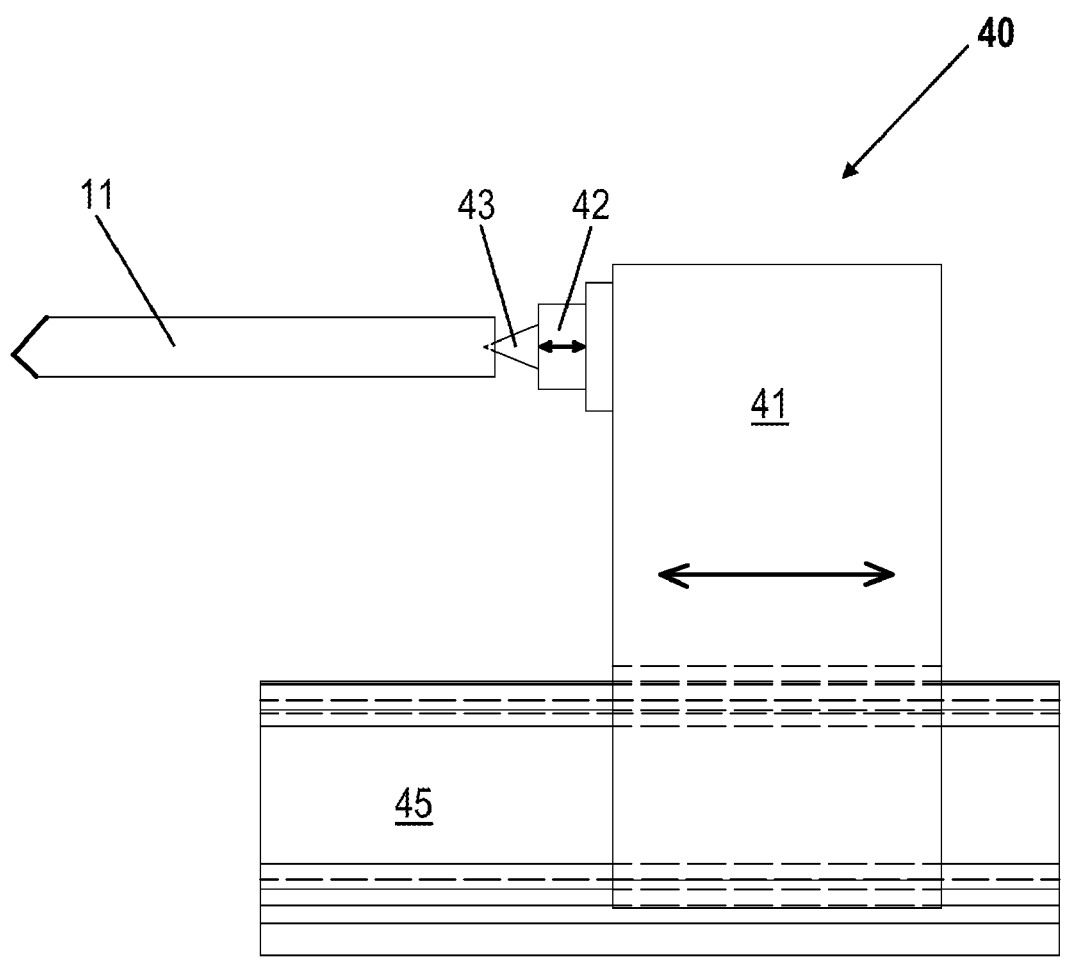
FIG. 6 depicts a side view of the longitudinal positioning mechanism.

Turning now to FIG. 6, the rear support mechanism 40 is shown in greater detail. Rear support mechanism 40 can include at least two means of positionally adjusting the workpiece 11; body 41 can be moved along tracks 45 programmatically to physically abut the rear end of the workpiece 11 with cone 43. Additionally, shaft 42 can be extendable from body 41 to apply programmatically set pressure to the workpiece 11.

Figure 7A:
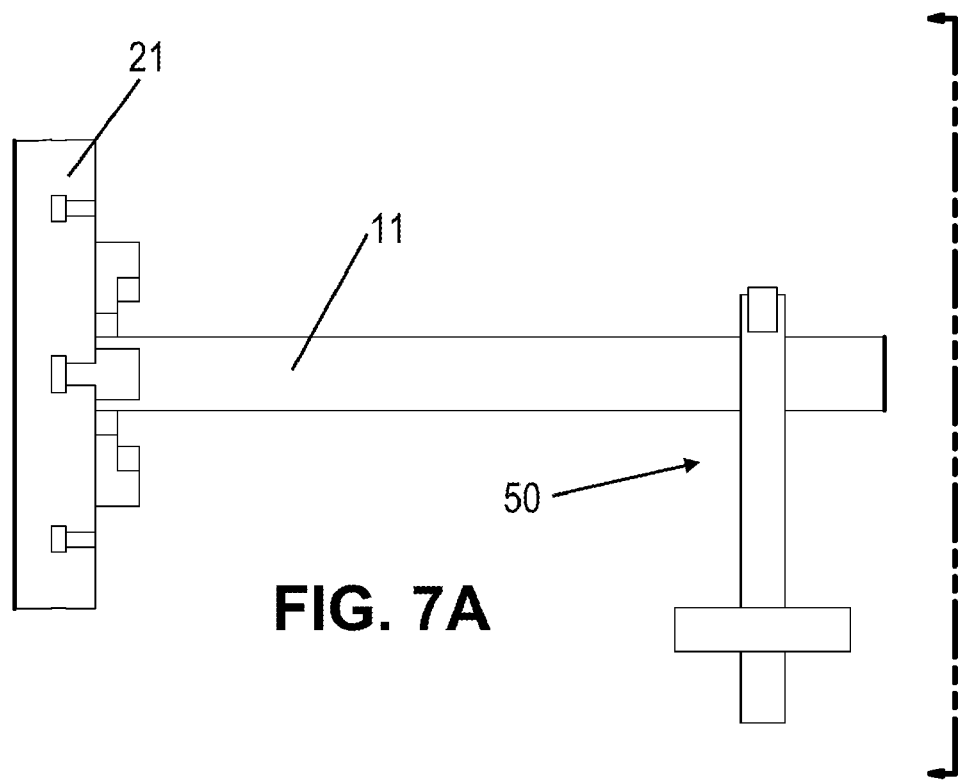
FIGS. 7A-7B depict a side and front view of the centerline positioning mechanism.
Figure 7B:
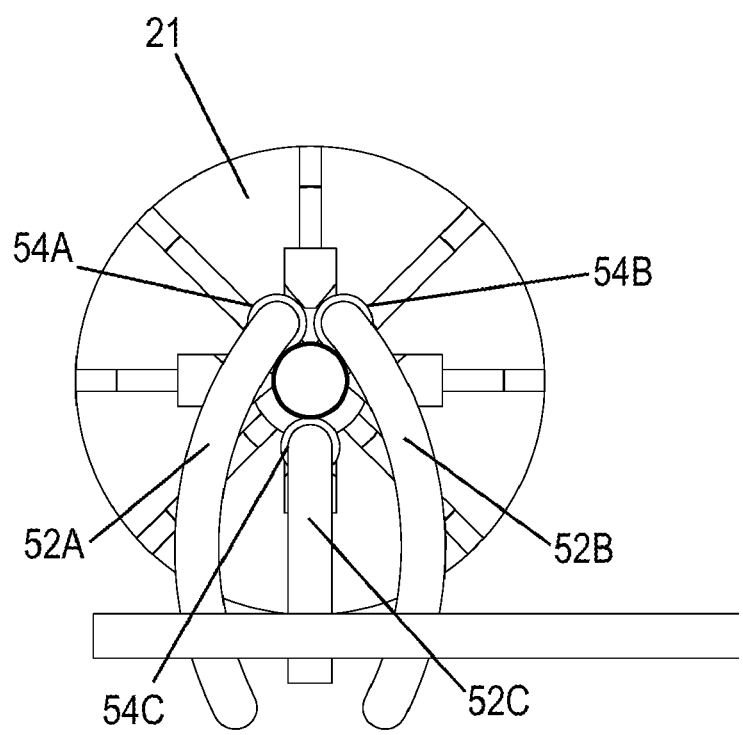

Turning now to FIGS. 7A-7B, the centerline support mechanism 50 is shown in greater detail in relation to chuck head 21. As shown, the centerline support mechanism 50 can comprise three shafts for supporting the workpiece 11, two lateral bowed shafts 52A, 52B, and a straight undershaft 52C. Each shaft 52A-C can comprise a roller surface end 54A-C (respectively) for allowing rotation of the workpiece while still providing support against, e.g., wobbling workpieces with long lengths and narrow diameters. The centerline support 50 can be moveable programmably along the rotational axis perpendicular to the chuck head 21, and shafts 52A-C may be programmed to accommodate differing diameters similarly to jaws 24.

Figure 8A:
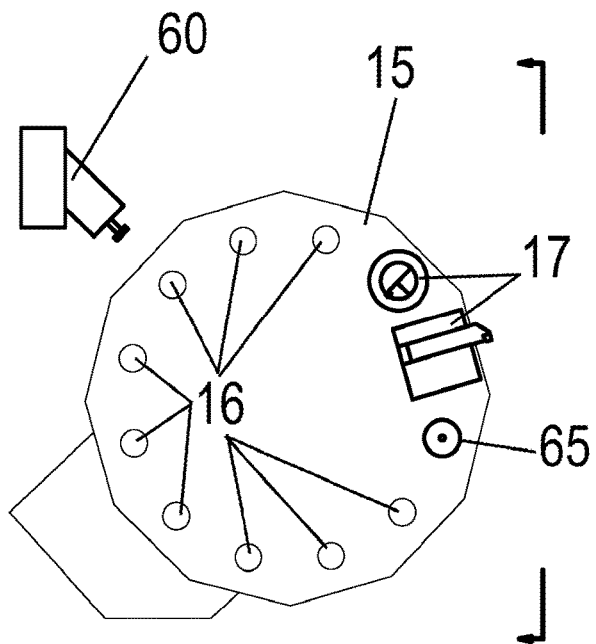
FIGS. 8A-8D depict the set point and measurement sensors.
Figure 8B:
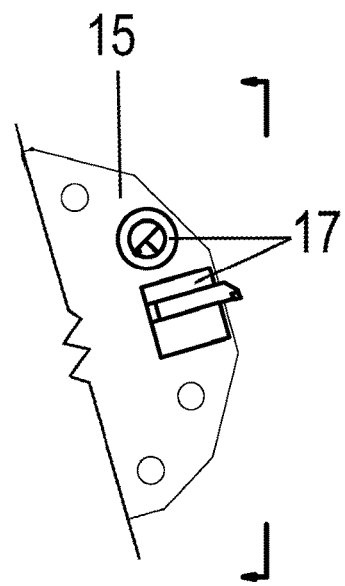
Figure 8C:
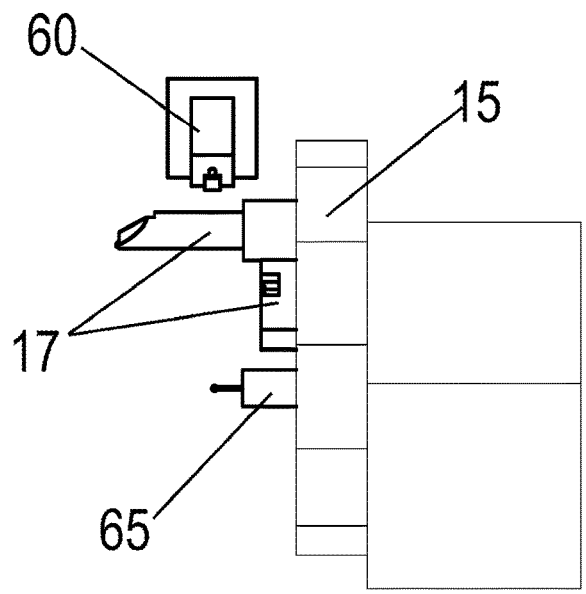
Figure 8D:
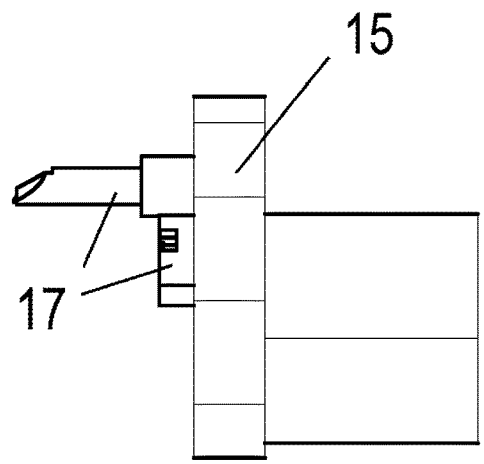

Turning now to FIGS. 8A-8D, the tool housing 15 is shown in greater detail. Tool housing can comprise sockets 16 (nine empty sockets visible in FIG. 8A), two to three of which are occupied in the depicted embodiment (FIGS. 8A and 8C depict the workpiece sensor 65, which is absent in FIGS. 8B and 8D). The tool housing 15 may house various cutting and shaping tools 17, which may utilize any CNC socketing system known in the art. In an embodiment, a set point sensor 60 can be used to measure the original position of the cutting point of any cutting tools used on workpiece 11 (shown in FIG. 1) when originally installed, as well as after the cutting. This allows an original set point and can also determine wear on the cutting tool. Set point sensor 60 may be a laser, an imaging device, or a mechanical probe. Additionally, workpiece sensor 65 can occupy a socket 16 of the tool housing 15 and can monitor the dimensions of workpiece 11 (shown in FIG. 1). Workpiece sensor 65 may be a laser, imaging device, or mechanical probe.

In use, the system 10 can be controlled by a nonproprietary consumer PC which can adjust the rotation and jaw tolerances of the chuck 20, halt the rotation of chuck 20 using the brake mechanism, adjust the centerline support mechanism 50 or the location and pressure supplied by the rear support mechanism 40. Robot 70 and manipulator 75 can swap workpieces 11 to and from the system 10 as they are shaped, and they can store completed pieces or raw materials in storage systems 80. Storage systems 80 (depicted as vertical carousels; other storage systems may be used within the scope of the invention) may also store new and worn cutting tool heads for tool housing 15 as they are replaced by robot 70 and robot manipulator 75. Storage systems 80 are programmable to select the tool, piece of raw material and/or the location for the finished piece and present that location to robot 70.

While the present invention has been described with emphasis on the embodiments depicted and described above, it should be understood that within the scope of the appended claims, the present invention can be practiced other than as specifically described herein, and that the appended claims are intended to include all such alternatives, modifications, and variations that fall within the spirit of the invention and scope of the claims.

What is claimed is:

1. A computer-controlled device for machining a plurality of workpieces of varying size comprising:
    a chuck positioned along a rotational axis and comprising a head and a plurality of protrusions that extend from the head and move inward and outward relative to the rotational axis;
    an inner shaft attached to the plurality of protrusions and driven by a first motor;
    an outer shaft attached to the head of the chuck and selectively coupled to the inner shaft, the outer shaft receiving torque from a second motor; and
    a first gear receiving torque from the first motor and a second gear coupled to the inner shaft and selectively aligned to the first gear,
    wherein rotation of the inner shaft positions the plurality of protrusions within the head of the chuck, wherein the position of the plurality of protrusions is programmable to a specific distance from the rotational axis to compress against and rotate the plurality of workpieces with varying levels of force, wherein the outer shaft rotates the chuck when the outer shaft is coupled to the inner shaft, and wherein the first gear is aligned with and transfers torque to the second gear when the outer shaft is de-coupled from the inner shaft.

2. The device of claim 1, wherein the inner shaft and outer shaft are selectively coupled by a clutch device positioned along the rotational axis, wherein a first portion of the clutch device is attached to the outer shaft, wherein a second portion of the clutch device is attached to the inner shaft, and wherein the outer shaft is de-coupled from the inner shaft when the first portion and the second portion of the clutch device are uncoupled.

3. The device of claim 2, further comprising at least one biasing member biasing the second clutch portion away from the second gear and towards the first clutch portion, wherein the bias is sufficient to push the second gear out of alignment from the first gear.

4. The device of claim 1, further comprising a brake selectively preventing rotation of the outer shaft.

5. The device of claim 1, wherein the plurality of protrusions are selectively removeable from the head of the chuck.

6. The device of claim 1, wherein the head of the chuck comprises a plurality of radial slots which receive the plurality of protrusions.

7. The device of claim 6, wherein the inner shaft positions the plurality of protrusions along the plurality of radial slots by means of a scroll plate.

8. The device of claim 1, wherein the force is variable relative to a diameter of the plurality of workpieces, and wherein the plurality of protrusions are programmable to release the plurality of workpieces.

9. The device of claim 1, further comprising a tool housing comprising a plurality of cutting and shaping tools, and wherein the program selectively controls the rotation of the chuck, the positioning of the plurality of protrusions, and the positioning of the plurality of cutting and shaping tools within a work envelope.

* * * * *